(12) United States Patent
Fritsch

(10) Patent No.: US 11,666,992 B2
(45) Date of Patent: Jun. 6, 2023

(54) METHOD OF MANUFACTURING A PIPE HAVING A CONNECTING FLANGE

(71) Applicant: Liebherr-France SAS, Colmar (FR)

(72) Inventor: Pascal Fritsch, Artzenheim (FR)

(73) Assignee: Liebherr-France SAS, Colmar (FR)

( * ) Notice: Subject to any disclaimer, the term of this patent is extended or adjusted under 35 U.S.C. 154(b) by 239 days.

(21) Appl. No.: 16/856,331

(22) Filed: Apr. 23, 2020

(65) Prior Publication Data

US 2020/0338670 A1    Oct. 29, 2020

(30) Foreign Application Priority Data

Apr. 24, 2019 (DE) .................... 10 2019 110 603.6

(51) Int. Cl.
*B23K 31/02* (2006.01)
*B23K 101/04* (2006.01)
*B23K 101/06* (2006.01)

(52) U.S. Cl.
CPC ........ *B23K 31/027* (2013.01); *B23K 2101/04* (2018.08); *B23K 2101/06* (2018.08)

(58) Field of Classification Search
CPC .............. B23K 31/027; B23K 2101/04; B23K 2101/06; B23K 2101/10; F16C 2226/36; F16C 2226/32; F16C 2226/34
See application file for complete search history.

(56) References Cited

U.S. PATENT DOCUMENTS

2007/0216159 A1    9/2007 Yoshihara et al.
2018/0023704 A1*  1/2018 Yamamoto ............. B23K 26/21
                                                     212/349

FOREIGN PATENT DOCUMENTS

CN     102886634 A      1/2013
DE      19730418 A1     1/1999
DE    102011086463 A1   5/2013

* cited by examiner

*Primary Examiner* — Christopher J Besler
(74) *Attorney, Agent, or Firm* — Dilworth & Barrese, LLP

(57) ABSTRACT

The invention relates to a method of manufacturing a pipe having a connecting flange, wherein the flange part is welded to an end face pipe end and at least one protrusion of the pipe or of the flange part is provided in the region of the flange hub and contacts the inner wall of the other part on the joining together of the pipe and the flange part to cover the formed weld joint to the pipe interior; and wherein finally the pipe and the flange part are welded to one another.

7 Claims, 1 Drawing Sheet

METHOD OF MANUFACTURING A PIPE HAVING A CONNECTING FLANGE

BACKGROUND OF THE INVENTION

The invention relates to a method of manufacturing a pipe having a connecting flange, wherein the flange part is welded to an end face pipe end.

Pipes are differently stressed depending on the application. There are in particular high pressure fluctuations with hydraulic applications due to large load changes so that high strength demands are in particular made on hydraulic pipes. One weak point here is represented by welded connections such as in the region of the flange hub of a pipe. Material fatigue can occur very fast here due to the constant high load changes. Established welded connections therefore always have to be 100% tested, which takes place by complex and/or expensive ultrasound examinations in practice.

So-called TIG welding (tungsten inert gas welding) is used for the quality assurance of the welded connections to be established. For this purpose, the pipe and the flange part are horizontally clamped in a plant and the welding apparatus is guided by 360° about the weld seam while a plurality of welding layers (for example: a total of at least four welding layers) are applied using the comparatively slow TIG welding process. The performance of a plurality of welding layers is, however, very time consuming and accordingly causes high production costs. There is therefore a desire for a less expensive manufacturing method for the welding of pipes, in particular hydraulic pipes.

SUMMARY OF THE INVENTION

This object is achieved by a method in accordance with the features herein, with advantageous embodiments of the method resulting from the description herein.

It is proposed in accordance with the invention that at least one protrusion of the pipe or of the flange part is maintained in the region of the flange hub. This protrusion contacts the inner wall of the oppositely disposed part on the joining together of the pipe and the flange part. If, for example, the protrusion is an element of the pipe, it contacts the inner wall of the flange part. The same applies to the case that the protrusion is an element of the flange part. On the joining together, it contacts the inner diameter of the pipe. The protrusion therefore forms a type of cover of the weld joint between the pipe and the flange part, i.e. the connecting seam formed is covered in the direction of the inner pipe space. It can thereby be prevented that weld metal can penetrate via the weld joint inwardly into the pipe during the welding process and that unwanted penetration welding occurs.

This creates the necessary requirements to be able to use an alternative welding method, that enables a faster and less expensive welding process for such pipes, instead of the time-consuming TIG welding process.

In accordance with an advantageous embodiment, the pipe and the flange part can now be joined together by means of MAG welding processes (metal active gas welding). Both connecting parts, i.e. the flange part and the pipe, are welded to one another from the outside for this purpose. A deposition of weld metal is prevented by the protrusion.

A single welding layer can in particular be sufficient with the use of the MAG welding method to join the two parts, i.e. the pipe and the flange part, together. The processing time is accordingly considerably shortened. In accordance with experience, this can be accelerated by a factor of 10 over conventional methods (TIG welding process).

A further advantage of the invention comprises the protrusion in accordance with a preferred embodiment, likewise serving as a centering aid on the joining together of the pipe and the flange part. For example, a corresponding abutment edge is formed by the protrusion so that both pipe parts to be welded can be joined together in an exact fit. Since the protrusion has to contact the inner diameter of the oppositely disposed part, an aligned positioning of both parts is ensured.

In accordance with a further advantageous embodiment of the invention, the protrusion can serve as an additional welding additive. Accordingly, welding additive is not only introduced into the weld joint from above, but the protrusion is rather thus equally heated and fused with the oppositely disposed part.

Provision can be made in accordance with a specific embodiment that the pipe or alternatively the flange part comprises a radially outwardly chamfered end face. On the joining together of the two parts, a V-shaped weld joint is thus formed that can be filled with the required weld metal during the welding procedure. It is advantageous here if a multi-step joint edge is formed at the pipe or alternatively at the flange part that is ideally formed at the edge of the end face of the pipe or of the flange part facing the inner pipe space. The radially innermost step, i.e. the step in the region of the inner pipe space, here forms the protrusion, while the radially outer step represents the base of the weld joint on the joining together.

As already explained above, the aforesaid manufacturing method is in particular suitable for manufacturing a hydraulic pipe, i.e. for attaching a corresponding flange part to a pipe provided for the hydraulics.

BRIEF DESCRIPTION OF THE DRAWINGS

Further advantages and properties of the invention will now be explained in more detail in the following with reference to a specific embodiment.

There are shown.

DESCRIPTION OF THE PREFERRED EMBODIMENT

Figure 1:
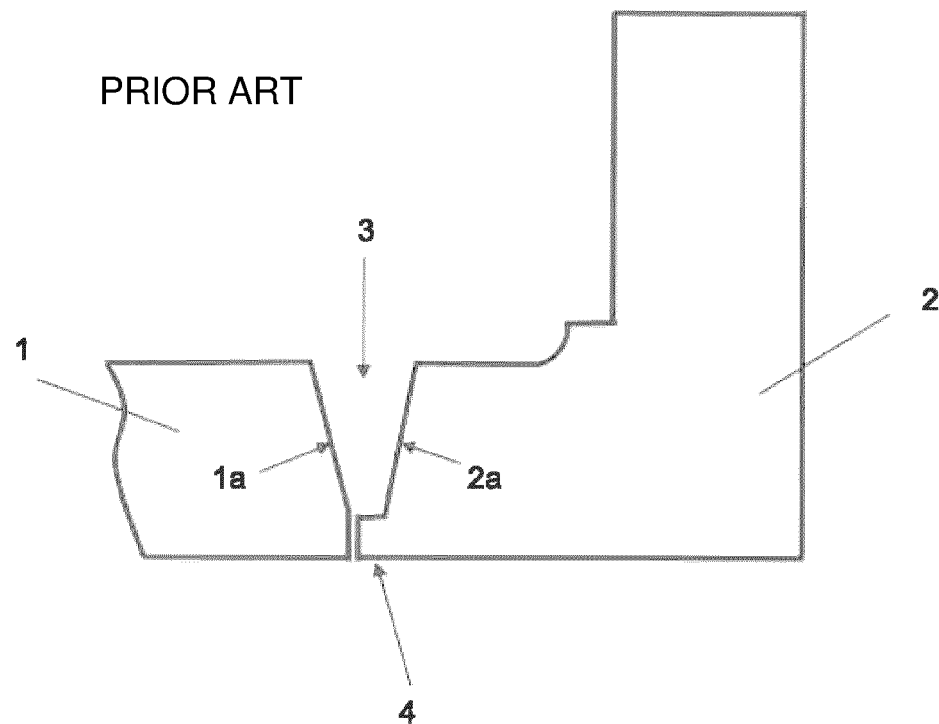
FIG. 1: a sketch of a conventional hydraulic pump in the region of the flange hub.

FIG. 1 shows a sketch of the end face end of a hydraulic pipe 1 that is produced according to a conventional manufacturing method. The flange part 2 equally shown should be welded to the shown end. It can be recognized here that both the hydraulic pipe 1 and the flange part 2 have a contact edge 1a, 2a outwardly declining in the radial direction. A V-shaped weld joint 3 is thereby formed on the positioning of the two parts 1, 2 for the welding procedure. The contact edge 2a of the flange part 2 has a step 4 at the radially inwardly disposed region that forms the base of the V-shaped joint 3 on the joining together of the two parts 1, 2.

Since there is the risk in this starting situation that penetration welding occurs in the region of the contact point between the pipe 1 and the flange part 2, i.e. in the region of the step 4, and that weld metal can thereby penetrate into the pipe volume, a plurality of welding layers are sequentially applied by means of the slow TIG welding procedure.

Figure 2:
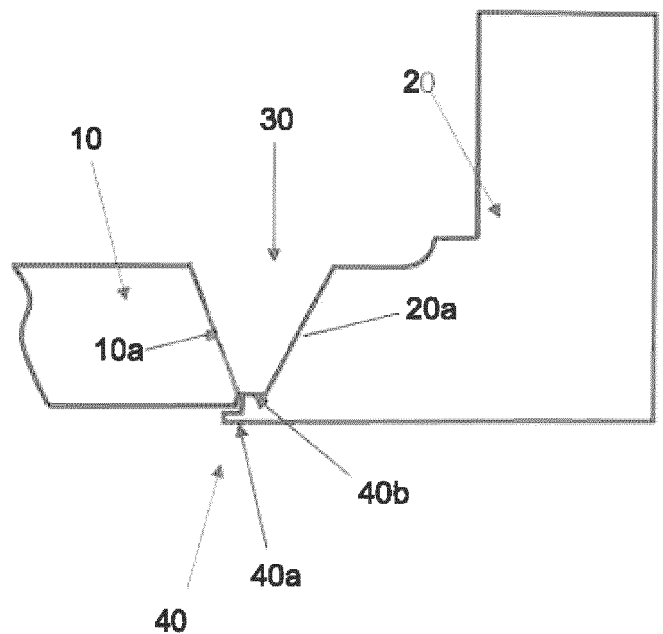
FIG. 2: a corresponding sketch of a hydraulic pipe in accordance with the production in accordance with the invention.

FIG. 2 now shows the approach in accordance with the invention for an innovative manufacturing method of hydraulic pipes. In this respect, the hydraulic pipe 10 is first produced with a partially straight and partially chamfered contact or face edge 10a and the flange part 20 is in turn manufactured with a radially outwardly descending contact edge 20a. A double-step 40 is moreover shaped at the radially inner region of the contact edge 20a and its radially innermost step 40a forms a protrusion and its radially further outwardly disposed step 40b forms the base of the weld joint 30 on the joining together of the parts 10, 20.

The step 40a forming the protrusion contacts the inner wall of the pipe 10 on the joining together of the parts 10, 20, whereby the contact point of the weld joint 30 to the pipe interior is closed by the contacting step 40a. It is hereby ensured that no weld metal can penetrate inwardly into the pipe interior during the welding process. On the other hand, the double-stepped formation of the contact edge 20a simultaneously serves as a positioning aid on the joining together of the parts 10, 20. The rise disposed between the steps 40a, 40b serves as an abutment in the longitudinal direction of the pipe, while the step 40a forms an abutment in the radial direction. An exactly fitting and aligned positioning of the flange part 20 relative to the pipe part 10 is thereby simplified.

The design of the flange part 10 shown with the protrusion 40a provides the necessary requirement to be able to make use of the faster MAG welding method instead of the time-consuming TIG welding method. The weld joint 30 is filled with weld metal during the welding process. There is also the benefit here that the protrusion 40a likewise serves as additional weld metal and is fused with the pipe part 10.

The invention claimed is:

1. A method of manufacturing a pipe (10) having a connecting flange (20), comprising the steps of
   providing a pipe (10) and a flange (20), wherein
      the pipe (10) is provided with a radially outwardly declining slanted end (10a) and the flange (20) is provided with a radially outwardly declining contact face (20a),
      said radially outwardly declining contact face (20a) having
         at least one protrusion (40) in a region of a flange hub,
         a multi-level course having a radially innermost step (40a) forming the protrusion (40),
         a further radially outwardly-disposed step (40b) forming a base for a weld joint (30), and
         a surface of said radially outwardly-disposed step (40b) extending perpendicularly from the radially innermost step (40a) and serving as an abutment in a longitudinal direction of the pipe (10),
      said flange (20) is provided at a radially innermost end of said radially outwardly declining contact face (20a),
         with said radially outwardly declining contact face (20a) having said at least one protrusion (40) in said region of said flange hub,
   then welding the flange (20) to an end face of the pipe (10), such that said at least one protrusion (40) contacts an inner wall of the pipe (10) to cover a thus-formed weld joint (30) to a pipe (10) interior.

2. A method in accordance with claim 1, wherein the welding of the flange to the end face of the pipe comprises joining the pipe and the flange by an MAG welding process at an outer pipe circumference.

3. A method in accordance with claim 1, wherein the pipe and flange are welded in a welding layer.

4. A method in accordance with claim 1, wherein the protrusion serves as a centering aid between the pipe and the flange.

5. A method in accordance with claim 1, wherein the protrusion serves as a weld additive.

6. A method in accordance with claim 1, wherein the pipe is a hydraulic pipe.

7. A method in accordance with claim 1, wherein said abutment of said radially innermost step (40a) also serves as an abutment in a radial direction of the pipe (10).

* * * * *